(12) United States Patent
Cui et al.

(10) Patent No.: US 11,064,425 B1
(45) Date of Patent: Jul. 13, 2021

(54) FACILITATION OF RADIO ACCESS NETWORK INTELLIGENT CONTROLLER FOR 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Hongyan Lei, Plano, TX (US); Sangar Dowlatkhah, Cedar Hill, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/801,902

(22) Filed: Feb. 26, 2020

(51) Int. Cl.
*H04W 48/18* (2009.01)
*H04W 48/16* (2009.01)

(52) U.S. Cl.
CPC .......... *H04W 48/16* (2013.01); *H04W 48/18* (2013.01)

(58) Field of Classification Search
CPC .............................. H04W 48/16; H04W 48/18
See application file for complete search history.

(56) References Cited

U.S. PATENT DOCUMENTS

2016/0286449 A1\* 9/2016 Choi ................. H04W 36/18
2020/0022203 A1\* 1/2020 Fujishiro ............ H04W 76/16

OTHER PUBLICATIONS

"3rd Generation Partnership Project; Technical Specification Group Radio Access Network; Evolved Universal Terrestrial Radio Access (E-UTRA); Small Cell Enhancements for E-UTRA and E-UTRAN—Higher layer aspects (Release 12)." 3GPP TR 36.842 V0.1.0 (Feb. 2013). 8 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)." 3GPP TS 36.300 V16.0.0 (Dec. 2019). 99 pages.

\* cited by examiner

*Primary Examiner* — Michael T Vu
(74) *Attorney, Agent, or Firm* — Amin, Turocy & Watson, LLP

(57) ABSTRACT

A radio access network (RAN) intelligent control (RIC) platform can support various RAN control functions ranging from basic RAN control functions to enhanced RAN control functions. The RIC can support microservices that can be centralized at an edge cloud or distributed such that service aware and mobility state aware dual connectivity (DC) can be utilized. This service aware and mobility state aware DC can allow a mobile device to take advantage of DC features for the services requiring high bandwidth, while reducing the signaling and reducing power consumption of the mobile device. The service aware and mobility state aware DC microservices can also be hosted at central location to generate processing efficiencies.

20 Claims, 10 Drawing Sheets

FACILITATION OF RADIO ACCESS NETWORK INTELLIGENT CONTROLLER FOR 5G OR OTHER NEXT GENERATION NETWORK

TECHNICAL FIELD

This disclosure relates generally to facilitating a radio access network intelligent controller. For example, this disclosure relates to facilitating a radio access network intelligent controller for service aware and mobility aware dual connectivity for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a radio access network intelligent controller is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
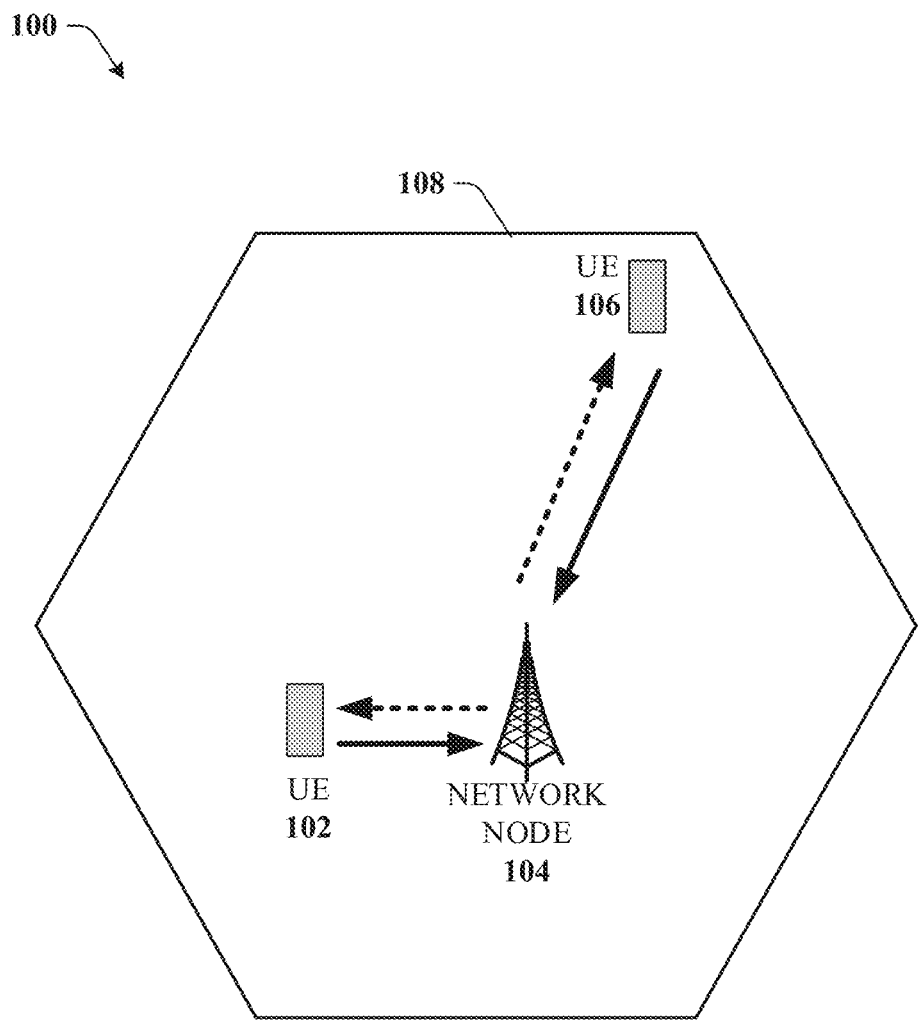
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a radio access network intelligent controller for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate a radio access network intelligent controller for a 5G network. Facilitating a radio access network intelligent controller for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A radio access network (RAN) intelligent controller (RIC) can comprise an extensible real-time micro-services (e.g., xApps) framework coupled with operator intent policy, real time data from the network and users, and network-artificial intelligence (AI) to enable a more granular RAN control, provide greater flexibility, and improve RAN efficiency. The RIC platform can support various RAN control functions ranging from basic RAN control functionality, such as traffic steering and mobility management, to the enhanced RAN control functions. RIC supported xApps can be centralized at an edge cloud or distributed, (e.g., eNB or gNB). This disclosure can provide service aware and mobility state (e.g., how quickly the device is moving) aware dual connectivity (DC) xApp, such that DC is considered and supported intelligently. DC can be accomplished when the UE has simultaneous connections to two different radio access points (e.g., UE connected to LTE and 5G mmW or connected to 5G sub6 as master and 5G mmW as secondary). The service aware and mobility state aware enhancements to the DC can allow the UE to take advantage of the DC feature for the services requiring high bandwidth, while reducing the signaling compared to existing solutions. For instance, in the case of 3GPP option 3×LTE/NR DC for non-standalone (NSA), while handover (HO) related signaling for master eNB (MeNB) is not avoidable, the signaling related to secondary eNB (SeNB) for release/setup can be avoided if the service does not need DC, or applications have stringent delay/jitter requirements (e.g., v2v, medical procedure, applications in 5G, etc.), or if the UE is in a high mobility state. In this case, a distributed DC xApp at the MgNB can make that decision. Since measurement, report, and acknowledgment (ACK)/negative acknowledgment (NACK) are performed when needed, it can also reduce the power consumption on the UE. It especially benefits 5G since significant amounts of millimeter wave (mmW) small cells can be introduced into a carriers' mobile network. This solution can be extended to 3GPP option 2 standalone (SA) when 5G core is introduced, and can also be extended to NR-NR carrier aggregation (CA). The current disclosure can benefit 5G and beyond while significant amounts of mmW small cells are introduced into carriers' mobile networks in combination with a macro anchor cell to provide high per-user throughput with robust mobility. The service aware and mobility state aware DC xApp can also be at a central location (e.g., at an edge cloud targeting for wide area optimization regarding DC admission control).

DC can allow UEs to simultaneously connect to macro and small cell in both downlink (DL) and uplink (UL). The previous can offer the following benefits to user traffic: improve heterogeneous network (HetNet) mobility robustness (e.g., macro eNB or gNB as mobility anchor, reduce frequent HOs), per-user throughput enhancement, reduce signaling overhead toward core network (CN), since only one 51 (e.g., interface between core network) and a mobility management entity (MME) connection per DC UE. The mmW small cells in combination with macro anchor cells can be leveraged to provide high per-user throughput with robust mobility. However, current solutions do not consider the types and characteristics of services/applications the UE is running and the UE mobility state when making DC decisions and selecting secondary cells (e.g., SgNBs or SeNBs). Currently, the DC is triggered if the DC trigger condition is met. For instance, the UE radio conditions and the load conditions of eNBs, can be used as triggers regardless of the services running on the device. Thus, service aware and mobility state aware DC decisions can be made in addition to the existing capabilities. For example, if a user is watching a movie while waiting for his/her flight at the airport, DC can select mmW as SgNB (if available) due to its high bandwidth. Additionally, a high percentage of the traffic for this application can be routed to the selected mmW SgNB cell to provide high throughput. However, if a stationary IoT device is providing low bit rate measurement reporting, DC may not be triggered. Conversely, if a user is driving at very high speed, a mmW small cell can be avoided as the SgNB due to small coverage.

During the attachment process, the UE can report its capability (e.g., DC-capable or not) to the master eNB/gNB (e.g., MeNB/MgNB). In the case of 3GPP option 3×, while the master cell is eNB, upon the decision (e.g., trigger DC check logic) provided by a distributed DC xApp at MgNB, the MeNB can inform the UE to listen to the candidate SgNB(s) in addition to the MeNB. The UE can then report to the MeNB about its radio conditions associated with the MeNB and SgNBs. The MeNB can also check the load conditions of each SgNB. If both radio condition(s) and load condition(s) are met, the MeNB can select a proper SgNB for the UE based on DC. This can also be applied to 3GPP option 2 SA. While HO-related signaling for MgNB is not avoidable, the signaling related to SgNB for addition/release can be avoided if the service does not need DC, applications have stringent delay/jitter requirements (e.g., v2v, medical procedure, etc.), and/or if the UE is in a high mobility state. In this case, a distributed DC xApp at MgNB can make that decision. An MeNB packet data convergence protocol (PDCP) flow controller can split the flow across the MeNB/ SeNB for the UE and decide a proper percentage of traffic running through the MeNB and the selected SeNB based on service characteristics, mobility state, delay/jitter requirements, and/or the MeNB and SeNB load conditions.

DC can be performed if certain radio conditions and load conditions are met such that the UE can be supported by the MeNB and the SeNB. In some scenarios, it may not be necessary to trigger DC, which can utilize additional resources. For DC, LTE and 5G mmW can be considered. In a mobile edge computing (MEC) environment, the RIC can see the RAN and understand the state of the RAN and the UE. The RIC can then roll up the xApps (e.g., microservices) to provide intelligence and optimization based on the overall system information. The DC microservice can reside at a central location on the MEC or at a radio node itself at the MeNB or MgNB.

In one embodiment, described herein is a method comprising prompting, by a first wireless network device comprising a processor, a mobile device to search for a signal from a second wireless network device. In response to the prompting the mobile device to search, the method can comprise prompting, by the first wireless network device, the mobile device to send radio condition data representative of a radio condition between the first wireless network device and the mobile device, and between the second wireless network device and the mobile device. Additionally, the method can comprise monitoring, by the first wireless network device, a network condition associated with the second wireless network device. Furthermore, based on the monitoring and a condition threshold associated with the radio condition being determined to have been satisfied, the method can comprise selecting, by the first wireless network device, the second wireless network device for a communication with the mobile device.

According to another embodiment, a system can facilitate, prompting a mobile device to search for a signal from a first wireless network device. In response to the prompting the mobile device to search, the system can facilitate further prompting the mobile device to return first radio condition data representative of a first radio condition between the mobile device and the first wireless network device, and second radio condition data representative of a second radio condition between the mobile device and a second wireless network device. Additionally, the system can comprise monitoring a load condition representative of a load associated with the first wireless network device. Furthermore, in response to the monitoring and a condition threshold associated with the first radio condition being determined to have been satisfied, the system can comprise selecting the first wireless network device for a communication with the mobile device.

According to yet another embodiment, described herein is a machine-readable medium that can perform the operations comprising prompting a mobile device to search for a signal from a first wireless network device. In response to the prompting the mobile device to search, the machine-readable medium can perform the operations comprising requesting first radio condition data representative of a first radio condition associated with the mobile device and the first wireless network device and requesting second radio condition data representative of a second radio condition associated with the mobile device and a second wireless network device. Additionally, the machine-readable medium can perform the operations comprising monitoring a load condition representative of a load associated with the first wireless network device. In response to the monitoring and a condition threshold associated with the first radio condition being determined to have been satisfied, the machine-readable medium can perform the operations comprising facilitating selecting the first wireless network device for a communication with the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
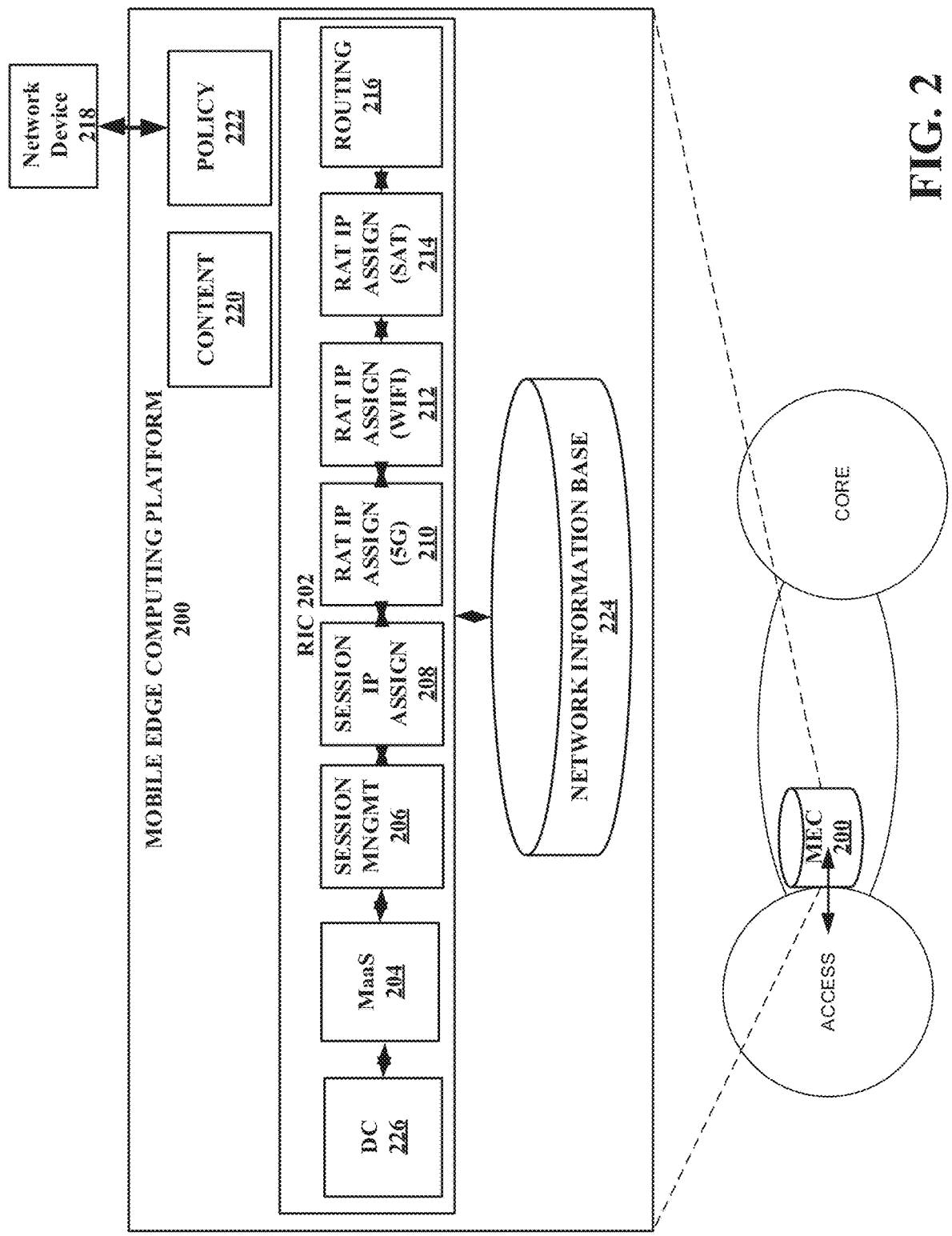
FIG. 2 illustrates an example schematic system block diagram of mobile edge computing platform according to one or more embodiments.

Referring now to FIG. 2, illustrated is an example schematic system block diagram of an example schematic system block diagram of mobile edge computing platform according to one or more embodiments. A radio access network intelligent controller (RIC), found within a mobile edge computing (MEC) platform 200, can comprise several microservices to increase system efficiencies. For example, the mobility as a service (MaaS) function 204 can determine how to treat traffic based on a mobility state (i.e., moving, non-moving, rate of speed, etc.) of the UE 102. The session management function 206 can maintain session continuity regardless of where the UE 102 is located within the network. For example, if a user is talking, then the session management function 206 can ensure that the session is not dropped. However, if the user is checking an email, then session continuity does not need to be maintained to receive the email. The session IP assignment function 208 can be used to maintain session continuity as well. Although a physical IP address can be changed, the session layer of the IP address cannot be changed. Thus, the RIC can comprise a microservice that provides the session IP address assignment. A radio access technology (RAT) IP assignment function 210 is for a physical layer IP that can be used for mobility management. If the UE 102 connects to Wi-Fi (e.g., RAT IP Assign Wi-Fi 212) and/or satellite (e.g., RAT IP Assign Sat 214, then there can be a corresponding IP address assigned to the UE 102. However, no matter which technology or the mobility status of the UE 102, the packet data can still be routed (e.g., tunnel-based routing, IP connection-based routing, etc.) via the routing function 216.

Additionally, the MEC platform 200 can comprise a DC function 226 microservice. DC can be accomplished when the UE has simultaneous connections to two different radio access points (e.g., UE connected to LTE and 5G mmW or connected to 5G sub6 as master and 5G mmW as secondary). The service aware and mobility state aware enhancements to the DC can allow the UE to take advantage of the DC feature for the services requiring high bandwidth, while reducing the signaling compared to existing solutions. DC can allow UEs to simultaneously connect to macro and small cell in both downlink (DL) and uplink (UL). The mmW small cells in combination with macro anchor cells can be leveraged to provide high per-user throughput with robust mobility. Thus, service aware and mobility state aware DC decisions can be made in addition to the existing capabilities. For example, the MEC platform 200 can leverage the MaaS function 204 to determine the mobility state of the UE 102. If a user is watching a movie while waiting (e.g., determined by the MaaS function 204) for his/her flight at the airport, the DC function 226 can trigger selection of mmW as the SgNB (if available) due to its high bandwidth. Additionally, a high percentage of the traffic for this application can be routed to the selected mmW SgNB cell to provide high throughput. However, if a stationary (e.g., determined by the MaaS function 204) IoT device is providing low bit rate measurement reporting, the DC function 226 may not be triggered. Conversely, if a user is driving (e.g., determined by the MaaS function 204) at very high speed, a mmW small cell can be avoided as the SgNB due to small coverage.

The network information base 224 can maintain the state of the RAN (whether the network is congested or not) and the state for each device (e.g., the radio link conditions of each UE 102). A wireless network device 218 operated by the service provider can comprise a policy that can determine which microservices should be utilized under certain conditions and in what order (e.g., sequence) the microservices should be executed. Within the MEC platform 200, local content 220 can be hosted to improve the performance, reduce latency, and reduce the transport time.

The wireless network device 218 can receive inputs from the policy function 222 to provide guidance on what policies the wireless network device 218 should allocate based on certain triggers. The wireless network device 218 can have access to the network state, the UE 102 state, and an inventory of microservices. There are various network resource management functions that can address specific aspects of the network (e.g., load balancing functions, handover functions, antenna function, power control functions, etc.). The wireless network device 218 can provide dynamic allocation of microservices instead of predefined decisions. Thus, the wireless network device 218 can dynamically output a policy to the policy function 222, based on the network state, and/or the UE 102 state and determine which trigger conditions to apply to allocation of microservices and in what order the microservices should be allocated. This data can then be communicated to the RIC.

The policy received from the wireless network device 218 can have intelligence and can make decisions about what microservices to use and in what order. The policy can also reside on multiple layers of the system: open network automation process (ONAP), RIC, core, and other areas. The policy from a service level agreement (SLA) can also affect user configuration on their devices. Thus, the dynamic policy can decide which services and what level to be exercised. Machine learning (ML) can reside within the policy and/or at the wireless network device 218. The ML can review the outcomes from previously applied policies as a feedback and make a decision at any time based on network congestion, SLA, premium customers, services with additional features etc. In an alternative embodiment, the ML can also be hosted on the ONAP platform and then ONAP platform can communicate with the RIC and the policy.

Figure 3:
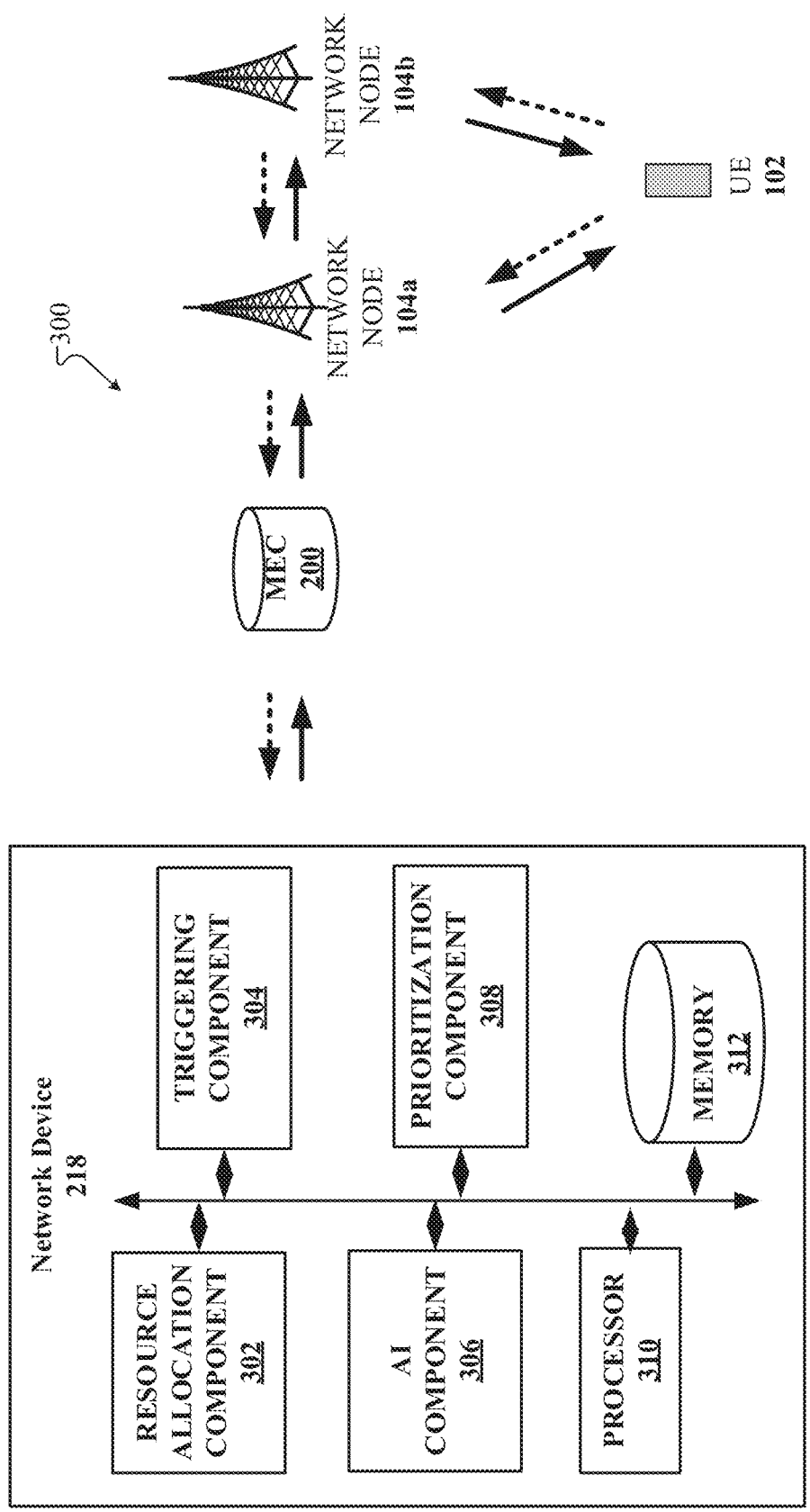
FIG. 3 illustrates an example schematic system block diagram of an example schematic system block diagram of a dual connectivity system according to one or more embodiments according to one or more embodiments.

Referring now to FIG. 3, illustrated is an example schematic system block diagram of an example schematic system block diagram of a dual connectivity system 300 according to one or more embodiments. As depicted in FIG. 3, the wireless network device 218 can comprise sub-components (e.g., resource allocation component 302, triggering component 304, AI component 306, and prioritization component 308), processor 310 and memory 312 can bi-directionally communicate with each other. It should also be noted that in alternative embodiments that other components including, but not limited to the sub-components, processor 310, and/or memory 312, can be external to the wireless network device 218. Aspects of the processor 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the wireless network device 218. In an aspect, the wireless network device 218 can also include memory 312 that stores computer executable components and instructions.

The triggering component 304 can receive/send data associated with triggers for specific microservices (e.g., DC function 226, MaaS function 204, etc.) to address specific network-based scenarios. For example, if a network load exceeds a certain threshold, then that threshold can be the trigger to invoke a load balancing microservice. Based on dynamic criteria, the triggering component 304 can trigger additional operations by the MEC 200. Consequently, the triggering component 304 can initiate resource allocation by the resource allocation component 302. The resource allocation component 302 can pull resources from other mobile devices and/or instantiate new resources in response to the triggering event. Network resources such as bandwidth, network capacity, beam patterns, beam pattern functions, workload assignments, etc., can be divided between UEs based on a priority associated with the UE in relation to the triggering event. For example, if the UE 102 is requesting emergency services and a second mobile device is requesting entertainment services, then the UE 102 can receive the highest priority (based on the state of the UE) via the prioritization component 308 because the UE 102 is requesting resources to facilitate mitigation of an emergency situation.

Priority assignments can be based on the type of UE 102, type of microservice, geographic location, UE 102 power, time, a type of emergency (e.g., a fire versus a car accident, etc.), number of concurrent emergencies, location, etc. Thus, based on the priority assigned by the prioritization component 308, the network resources can be allocated to the UE 102, by the resource allocation component 302, accordingly. Additionally, the AI component 306 can learn from previous patterns associated with microservice coordination, priorities assigned to specific microservices, and/or scenarios and modify microservice allocation based on the aforementioned factors and/or historical patterns analyzed by the AI component 306.

During the attachment process depicted in FIG. 3, the UE 102 can report its capability (e.g., DC-capable or not) to a master eNB/gNB (e.g., MeNB/MgNB 104a). In the case of 3GPP option 3x, while the master cell is eNB, upon the decision (e.g., trigger DC check logic) provided by the DC function 226 at MgNB 104a, the MgNB 104a can inform the UE 102 to listen to candidate SgNB(s) 104b in addition to the MeNB 104a. The UE 1012 can then report to the MeNB 104a about its radio conditions associated with the MeNB 104a and the SgNB 104b. The MeNB 104a can also check the load conditions of each SgNB 104b. If both radio condition(s) and load condition(s) are met, the MeNB 104a can select a proper SgNB 104b for the UE 102 based on DC. An MeNB 104a PDCP flow controller can split the flow across the MeNB 104a and the SeNB 104b for the UE 102 and decide a proper percentage of traffic running through the MeNB 104a and the selected SeNB 104b based on service characteristics, mobility state, delay/jitter requirements, and/or the MeNB 104a and SeNB 104b load conditions. It should also be noted that if another SeNB is selected for communication with the UE 102, the system can facilitate a disconnection between the UE 102 and the SeNB 104b.

Figure 4:
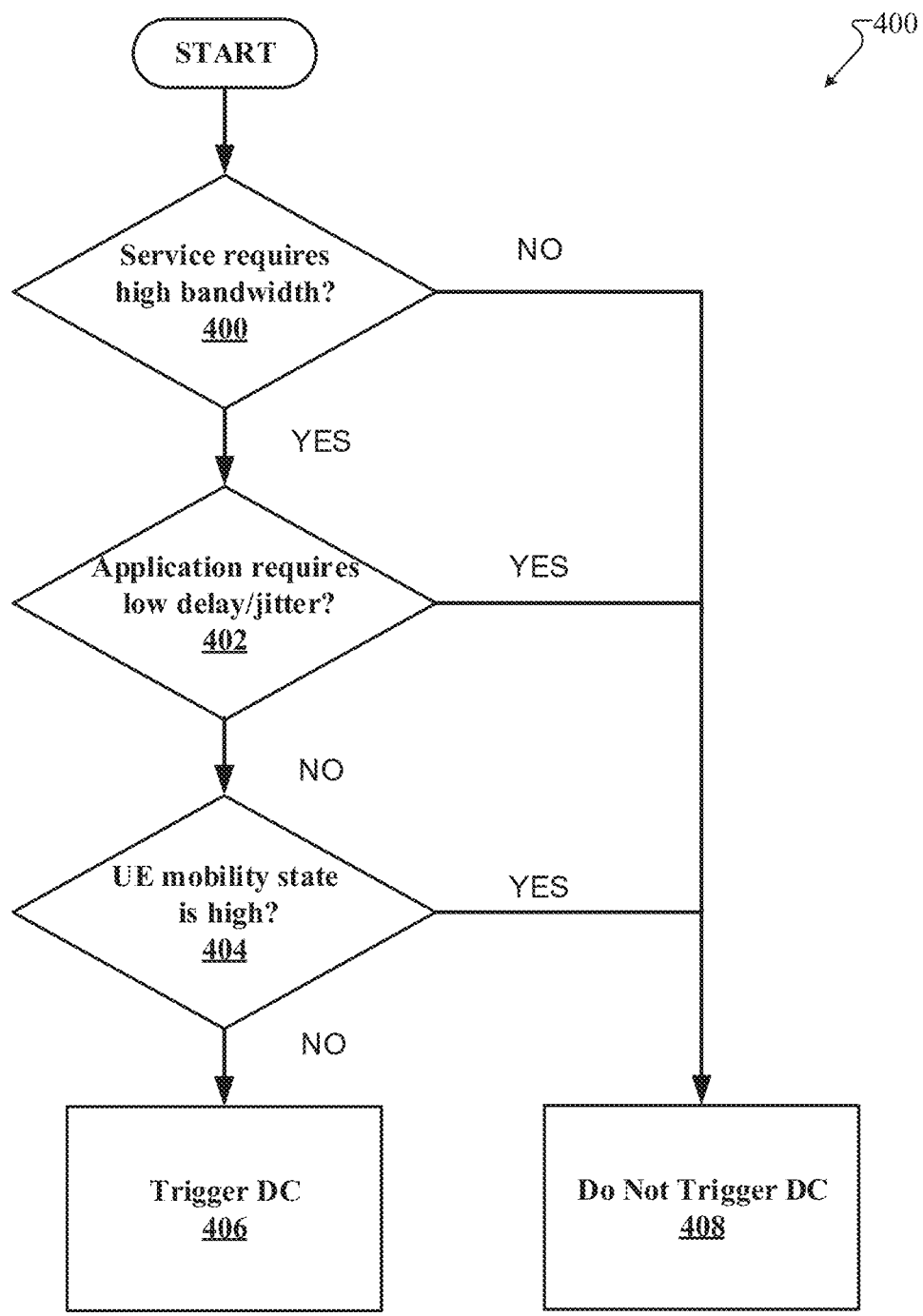
FIG. 4 illustrates an example schematic system block diagram of flow diagram for dual connectivity triggers according to one or more embodiments.

Referring now to FIG. 4, illustrated is an example schematic system block diagram of an example schematic system block diagram of flow diagram for dual connectivity triggers according to one or more embodiments.

If a service requires high bandwidth at block 400, an application does not require low delay/jitter at block 402, and a UE 102 mobility state is not high at block 404, then DC logic can be triggered at block 406. However, if the service does not require high bandwidth at block 400, the application requires low delay/jitter at block 402, or the UE 102 mobility state is high at block 404, then DC logic can not be triggered at block 408. DC can be performed if certain radio conditions and load conditions are met such that the UE 102 can be supported by the MeNB 104a and the SeNB 104b. In some scenarios, it may not be necessary to trigger DC, which can utilize additional resources. For DC, LTE and 5G mmW can be considered. In a mobile edge computing (MEC) environment, the RIC can see the RAN and understand the state of the RAN and the UE 102. The RIC can then roll up the xApps (e.g., microservices) to provide intelligence and optimization based on the overall system information. The DC microservice can reside at a central location on the MEC platform 200 or at a radio node itself at the MeNB/MgNB 104a.

Figure 5:
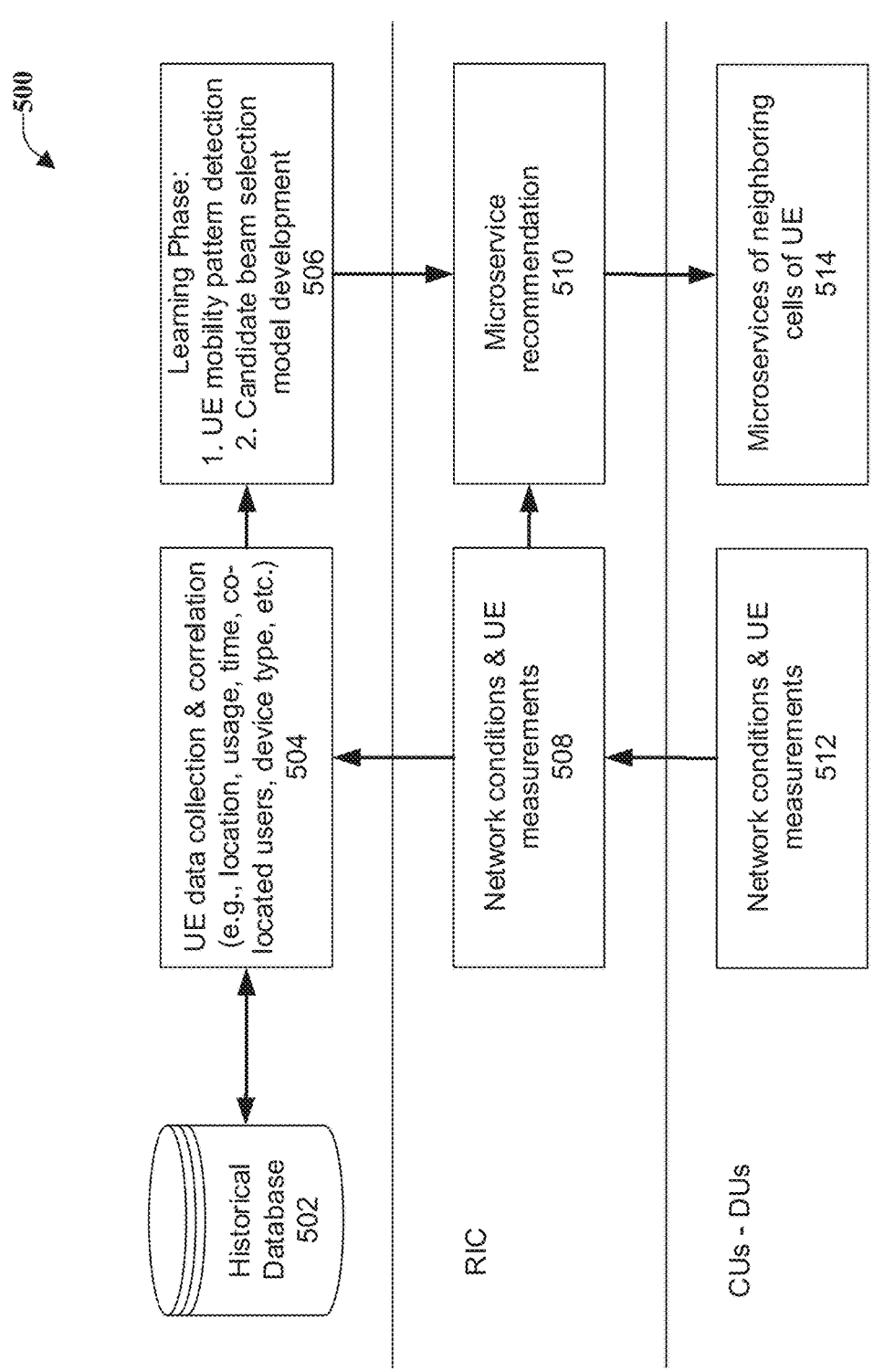
FIG. 5 illustrates an example schematic system block diagram of a closed loop control system according to one or more embodiments.

Referring now to FIG. 5 illustrates an example schematic system block diagram of an example schematic system block diagram of a closed loop control system according to one or more embodiments. A network management platform database 502 can send and receive data, associated with UEs 102 to block 504 where the UE data can be collected and/or correlated by a collection and correlation component. For example, location data can be correlated to time data associated with a specific UE (e.g., UE 102 is in/near macro-cell at 8 am most mornings). The UE data can comprise UE state data (collection data, correlation data, usage data, device type data, etc.). The UE data can be sent to the UE data collection and correlation component at block 504 from a network conditions and UE measurement component within the RIC at block 508. Once the UE data collection and correlation component receives the UE data and correlates the UE data, the UE data collection and correlation component can send the UE data and correlation data to a learning component at block 506. The learning component can utilize AI or machine learning (ML) to detect and/or predict UE mobility and network patterns and modify application of a microservice at block 510.

The network conditions and UE measurement component of centralized units (CUs) and/or distributed units (DUs) at block 512 can send the network condition and measurement data to the network conditions and UE measurement component within the RIC at block 508. The wireless network device 218 can then use the network measurements to determine which microservices are candidate microservices and then send the candidate microservices to the CUs and/or DUs at block 510. Microservices of neighboring cells of the UE 102 can be received by the CUs and/or DUs at block 514.

Figure 6:
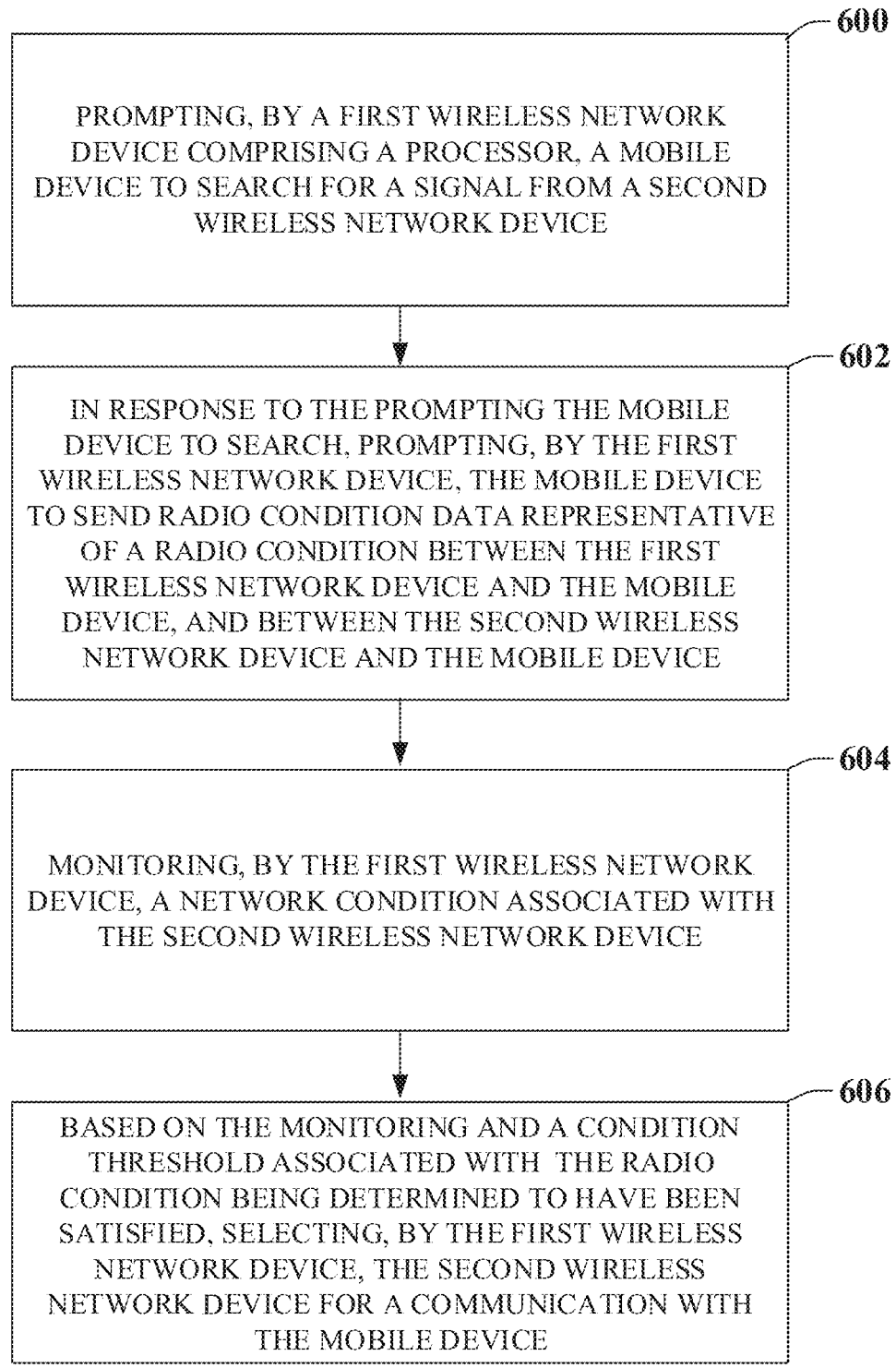
FIG. 6 illustrates an example flow diagram for a method for radio access network intelligent controller dual connectivity for a 5G network according to one or more embodiments.

Referring now to FIG. 6, illustrated is an example flow diagram for a method for radio access network intelligent controller dual connectivity for a 5G network according to one or more embodiments.

In one embodiment, described herein is a method comprising prompting, by a first wireless network device (e.g., MeNB 104a) comprising a processor, a mobile device (e.g., UE 102) to search for a signal from a second wireless network device (e.g., SeNB 104b). In response to the prompting the mobile device (e.g., UE 102) to search, the method can comprise prompting, by the first wireless network device (e.g., MeNB 104a), the mobile device (e.g., UE 102) to send radio condition data representative of a radio condition between the first wireless network device (e.g., MeNB 104*a*) and the mobile device (e.g., UE 102), and between the second wireless network device (e.g., SeNB 104*b*) and the mobile device (e.g., UE 102). Additionally, the method can comprise monitoring, by the first wireless network device (e.g., MeNB 104*a*), a network condition associated with the second wireless network device (e.g., SeNB 104*b*). Furthermore, based on the monitoring and a condition threshold associated with the radio condition being determined to have been satisfied, the method can comprise selecting, by the first wireless network device (e.g., MeNB 104*a*), the second wireless network device (e.g., SeNB 104*b*) for a communication with the mobile device (e.g., UE 102).

Figure 7:
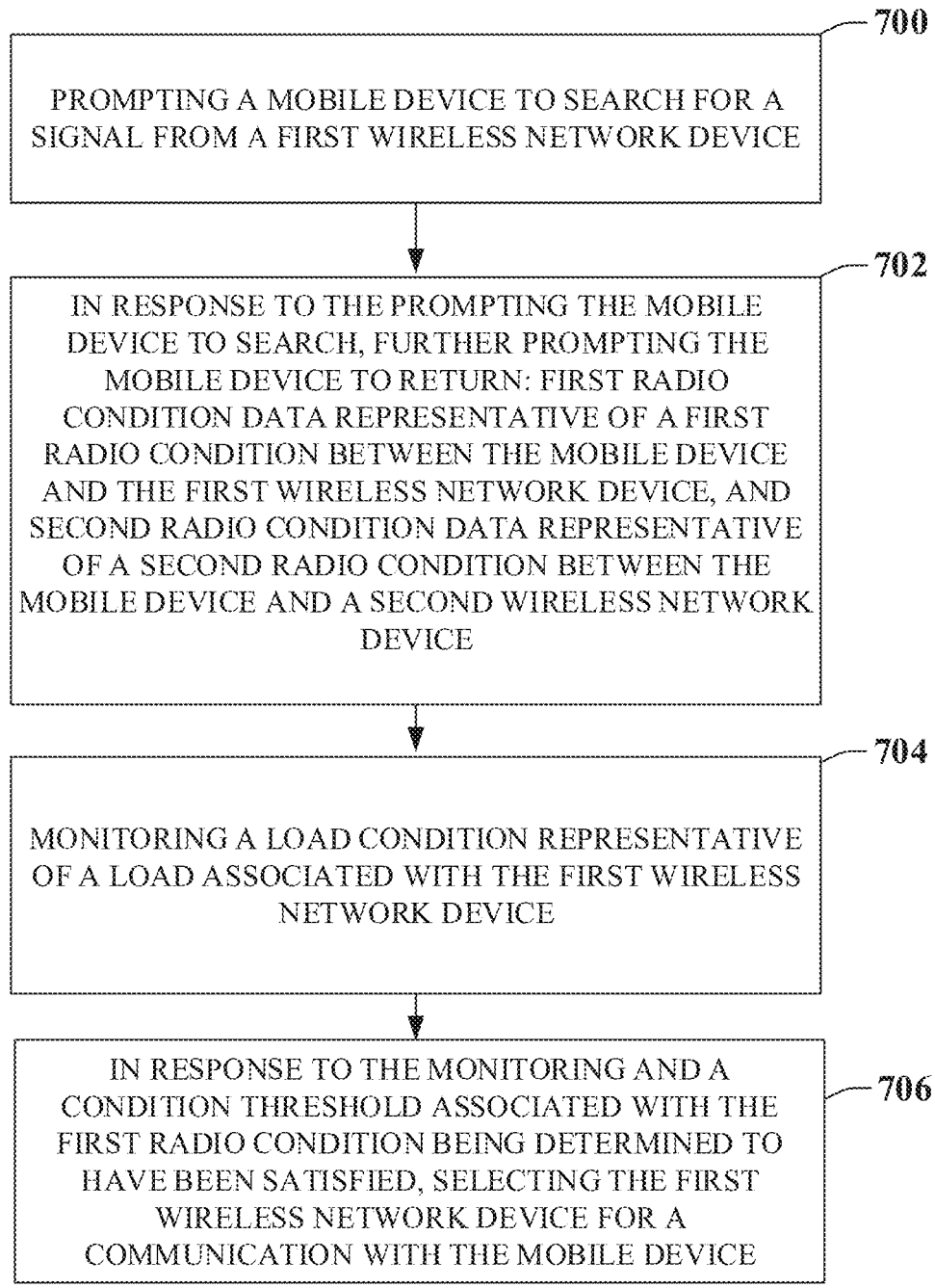
FIG. 7 illustrates an example flow diagram for a system for radio access network intelligent controller dual connectivity for a 5G network according to one or more embodiments.

Referring now to FIG. 7, illustrated is an example flow diagram for a system for radio access network intelligent controller dual connectivity for a 5G network according to one or more embodiments.

According to another embodiment, a system can facilitate, prompting a mobile device to search for a signal from a first wireless network device (e.g., SeNB 104*b*). In response to the prompting the mobile device (e.g., UE 102) to search, the system can facilitate further prompting the mobile device (e.g., UE 102) to return first radio condition data representative of a first radio condition between the mobile device (e.g., UE 102) and the first wireless network device (e.g., SeNB 104*b*), and second radio condition data representative of a second radio condition between the mobile device (e.g., UE 102) and a second wireless network device (e.g., MeNB 104*a*). Additionally, the system can comprise monitoring a load condition representative of a load associated with the first wireless network device (e.g., SeNB 104*b*). Furthermore, in response to the monitoring and a condition threshold associated with the first radio condition being determined to have been satisfied, the system can comprise selecting the first wireless network device (e.g., SeNB 104*b*) for a communication with the mobile device (e.g., UE 102).

Figure 8:
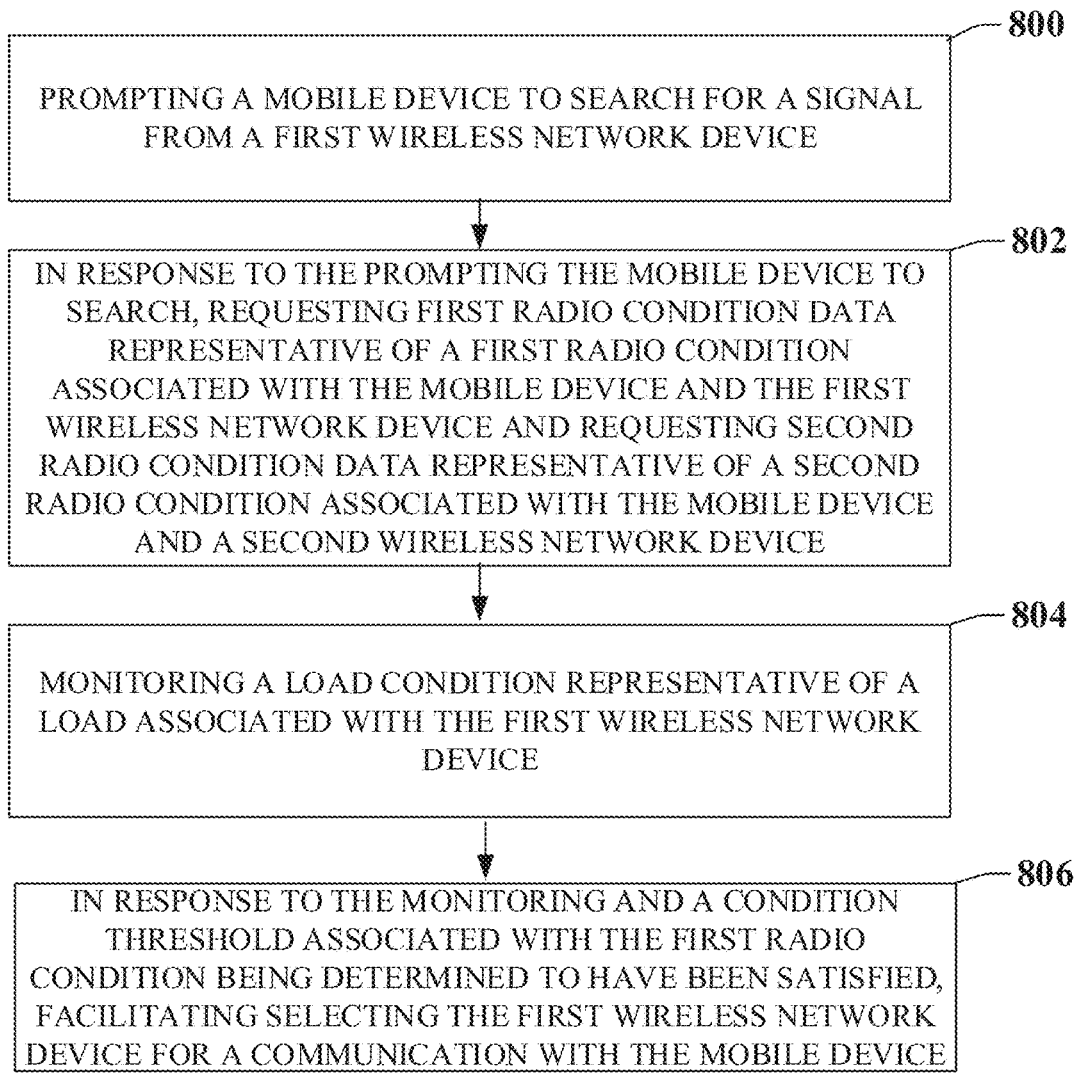
FIG. 8 illustrates an example flow diagram for a machine-readable medium for radio access network intelligent controller dual connectivity for a 5G network according to one or more embodiments.

Referring now to FIG. 8, illustrated is an example flow diagram for a machine-readable medium for radio access network intelligent controller dual connectivity for a 5G network according to one or more embodiments.

According to yet another embodiment, described herein is a machine-readable medium that can perform the operations comprising prompting a mobile device to search for a signal from a first wireless network device (e.g., SeNB 104*b*). In response to the prompting the mobile device (e.g., UE 102) to search, the machine-readable medium can perform the operations comprising requesting first radio condition data representative of a first radio condition associated with the mobile device and the first wireless network device (e.g., SeNB 104*b*) and requesting second radio condition data representative of a second radio condition associated with the mobile device (e.g., UE 102) and a second wireless network device (e.g., MeNB 104*a*). Additionally, the machine-readable medium can perform the operations comprising monitoring a load condition representative of a load associated with the first wireless network device (e.g., SeNB 104*b*). In response to the monitoring and a condition threshold associated with the first radio condition being determined to have been satisfied, the machine-readable medium can perform the operations comprising facilitating selecting the first wireless network device (e.g., SeNB 104*b*) for a communication with the mobile device (e.g., UE 102).

Figure 9:
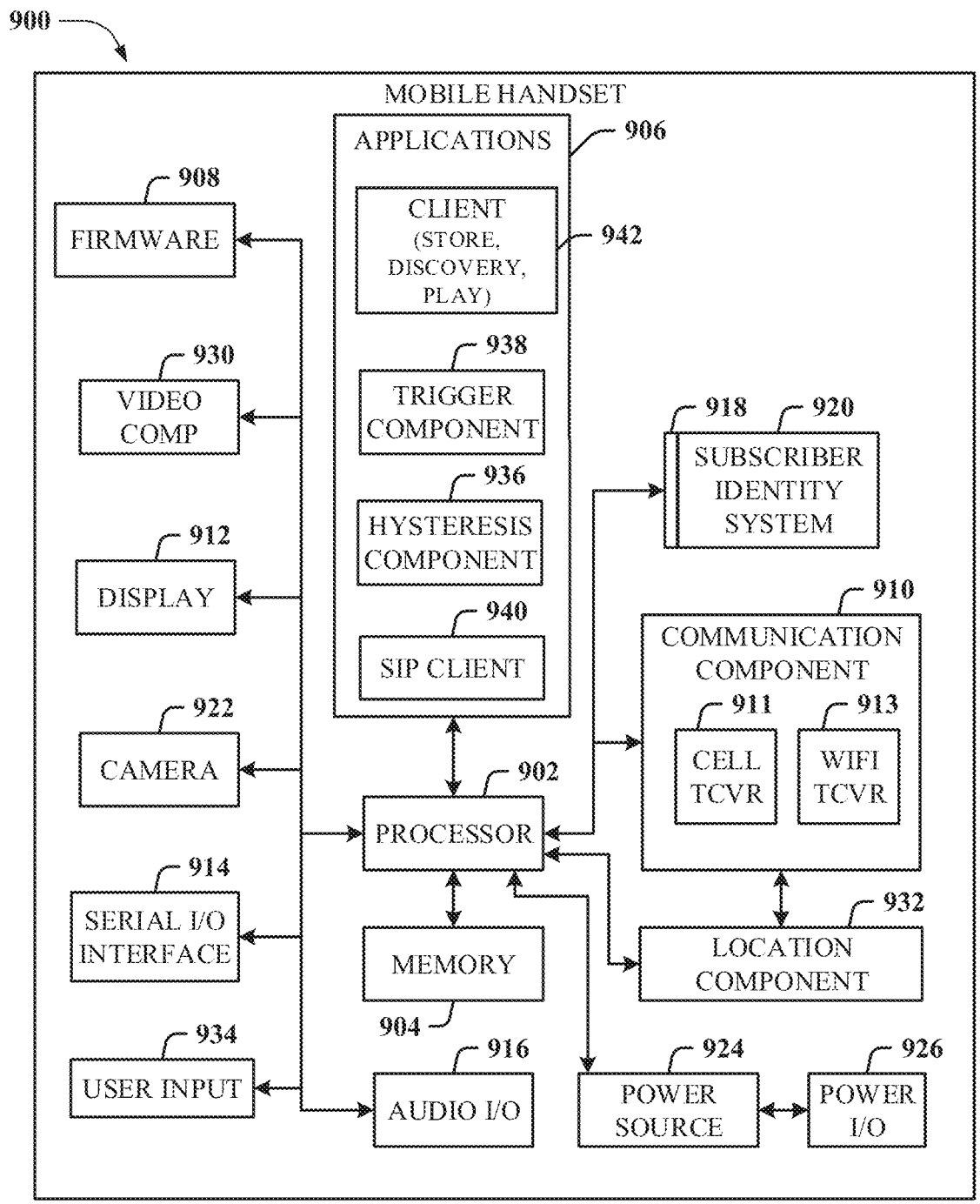
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal.

The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
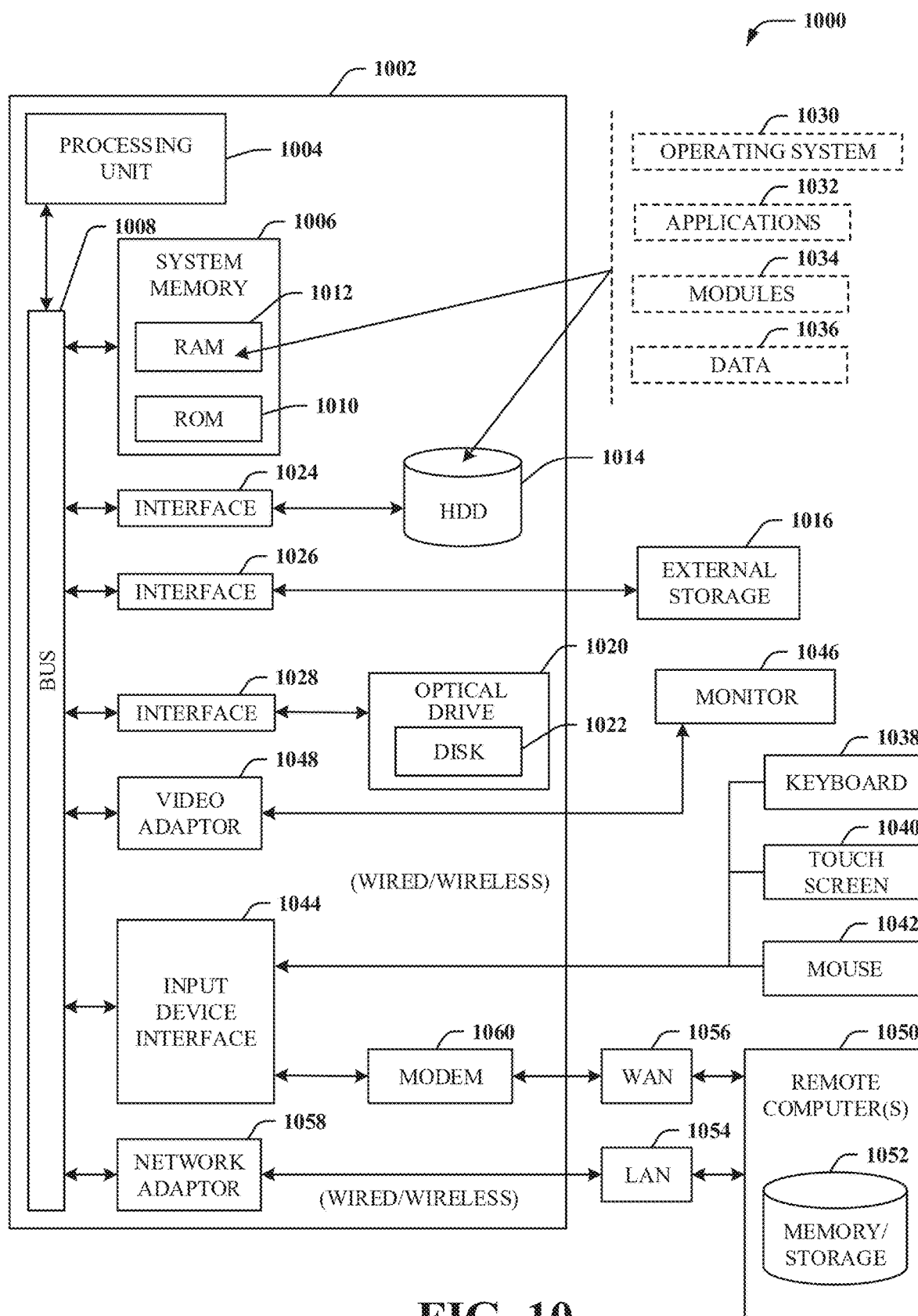
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

prompting, by first network equipment comprising a processor, a user equipment to search for a signal from second network equipment;

in response to prompting the user equipment to search, prompting, by the first network equipment, the user equipment to send radio condition data representative of a first radio condition between the first network equipment and the user equipment, and between the second network equipment and the user equipment;

monitoring, by the first network equipment, a network condition associated with the second network equipment;

based on the monitoring and a first function of a first condition threshold associated with the first radio condition being determined to have been satisfied, selecting, by the first network equipment, the second network equipment for a communication with the user equipment; and based on the monitoring, based on a second function of a second condition threshold, associated with a second radio condition of third network equipment, being determined to have been satisfied, and based on a mobility status of the user equipment, selecting the third network equipment for the communication with the user equipment.

2. The method of claim 1, wherein the second network equipment is secondary network equipment.

3. The method of claim 2, wherein the network condition is associated with a load condition of the secondary network equipment.

4. The method of claim 1, wherein the first network equipment is master network equipment.

5. The method of claim 1, wherein the first condition threshold is associated with the first radio condition between the first network equipment and the user equipment.

6. The method of claim 1, wherein the first condition threshold is associated with the first radio condition between the first network equipment and the user equipment and the mobility status of the user equipment.

7. The method of claim 1, wherein the first condition threshold is associated with the first radio condition between the second network equipment and the user equipment.

8. A system, comprising:

a processor; and a memory that stores executable instructions that, when executed by the processor, facilitate performance of operations, comprising:

prompting a user equipment to search for a signal from first network equipment;

in response to prompting the user equipment to search, further prompting the user equipment to return:

first radio condition data representative of a first radio condition between the user equipment and the first network equipment, and second radio condition data representative of a second radio condition between the user equipment and second network equipment;

monitoring a load condition representative of a load associated with the first network equipment;

in response to the monitoring and a first function of a first condition threshold associated with the first radio condition being determined to have been satisfied, selecting the first network equipment for a communication with the user equipment; and based on a mobility status of the user equipment, in response to the monitoring, and in response to a second function of a second condition threshold, associated with a third radio condition of third network equipment, being determined to have been satisfied, selecting the third network equipment for the communication with the user equipment.

9. The system of claim 8, wherein prompting the user equipment to search for the signal is performed in response to receiving service level data representative of a service level requirement.

10. The system of claim 8, wherein the operations further comprise:

in response to selecting the third network equipment for the communication with the user equipment, facilitating disconnecting the communication of the user equipment with the first network equipment.

11. The system of claim 8, wherein the second network equipment comprises a master eNode B device.

12. The system of claim 11, wherein the first network equipment comprises a secondary eNode B device in relation to the master eNode B device.

13. The system of claim 8, wherein selecting the first network equipment for the communication with the user equipment is performed in further response to a third function of a delay threshold being determined to have been satisfied.

14. The system of claim 8, wherein selecting the first network equipment for the communication with the user equipment is performed in further response to a third function of a jitter threshold being determined to have been satisfied.

15. A non-transitory machine-readable medium, comprising executable instructions that, when executed by a processor, facilitate performance of operations, comprising:

prompting a mobile device to search for a signal from first network equipment;

in response to prompting the mobile device to search, requesting first radio condition data representative of a first radio condition associated with the mobile device and the first network equipment and requesting second radio condition data representative of a second radio condition associated with the mobile device and second network equipment;

monitoring a load condition representative of a load associated with the first network equipment;

in response to the monitoring and a first condition threshold associated with the first radio condition being determined to have been satisfied, selecting the first network equipment for a communication with the mobile device; and in response to the monitoring and a second condition threshold, associated with the second radio condition, being determined to have been satisfied, and based on a mobility status of the mobile device, selecting third network equipment for the communication with the mobile device.

16. The non-transitory machine-readable medium of claim 15, wherein prompting the mobile device to search for the signal from the first network equipment is performed in response to an application requirement.

17. The non-transitory machine-readable medium of claim 16, wherein the application requirement is associated with a jitter threshold being determined to have been satisfied.

18. The non-transitory machine-readable medium of claim 15, wherein prompting the mobile device to search for the signal from the first network equipment is performed in accordance with a service level requirement.

19. The non-transitory machine-readable medium of claim 18, wherein the service level requirement is associated with maintaining at least a bandwidth threshold for a bandwidth available to the mobile device.

20. The non-transitory machine-readable medium of claim 15, wherein prompting the mobile device to search for the signal from the first network equipment is performed based on the mobility status.

* * * * *